(No Model.)
J. THINNES.
NUT LOCK.
No. 523,605. Patented July 24, 1894.
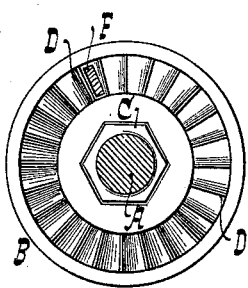
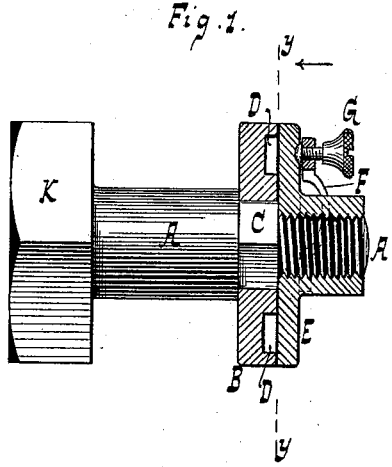
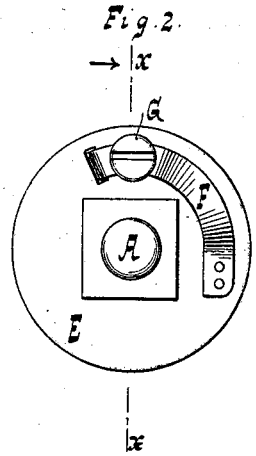
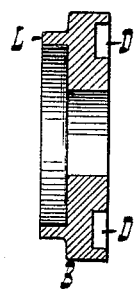
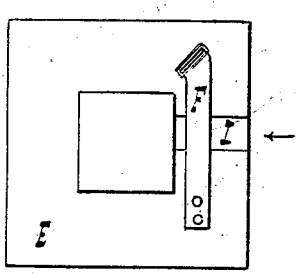
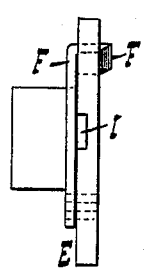
WITNESSES:
William M. Miller
Edward Wolff
INVENTOR:
Jacob Thinnes.
BY
Van Santvoord & Hauff
his ATTORNEYS.

UNITED STATES PATENT OFFICE.

JACOB THINNES, OF BROOKLYN, NEW YORK.

NUT-LOCK.

SPECIFICATION forming part of Letters Patent No. 523,605, dated July 24, 1894.

Application filed October 22, 1891. Serial No. 409,530. (No model.)

*To all whom it may concern:*

Be it known that I, JACOB THINNES, a citizen of the United States, residing at Brooklyn, in the county of Kings and State of New York, have invented new and useful Improvements in Nut-Locks, of which the following is a specification.

This invention relates to a nut lock suitable for various objects such as bolts or axles, and the invention consists in the details of construction set forth in the following specification and claims, and illustrated in the accompanying drawings, in which—

Figure 1 is a section of the nut lock along $x\ x$ Fig. 2. Fig. 2 is a face view of the nut with the lock. Fig. 3 is a section along $y\ y$ Fig. 1 showing a face view of a washer. Fig. 4 is a section of a modified form of washer. Fig. 5 is a face view of a modification. Fig. 6 is an edge view of Fig. 5.

In the drawings the letter A indicates a shank, or stem provided with a non-rotating washer B. The washer has an angular or non-circular hole fitting a corresponding head or shoulder C on the shank or stem so that when the washer is mounted on the shoulder it will not turn. The washer is provided with teeth D as seen in Fig. 3.

The nut E is provided with a spring F made to engage the teeth D so as to lock the nut when the latter is screwed home. The spring is shown as being secured to the outer face of the nut and the free end of the spring projects through an eye or hole in the nut so that said free end is in position to engage the teeth D.

When the nut E is to be unscrewed the spring has to be lifted out of engagement with the teeth D. Such lifting or disengaging of the spring can be variously accomplished. In Fig. 1 is shown a releasing screw G mounted in the spring and when the screw is turned in the proper direction it presses against the nut so as to lift the spring out of engagement with the teeth, thus leaving the nut free to be unscrewed.

In Figs. 5 and 6 the nut is shown with a groove I made to extend under the spring for the insertion of a releasing tool, such for example, as a screw driver or suitable strip of metal to lift the spring to its disengaging position.

The nut E can be variously formed, the nut in Fig. 2 for example, being circular or disk-shaped while the nut of Fig. 5 is angular. The spring F in Fig. 2 is shown curved while the spring F of Fig. 5 is straight.

The nut lock may be used under various circumstances. For example in Fig. 1 the stem or shank A has a head K and the device of Fig. 1 can be used for bolting together various articles, such for example, as fish plates in a railroad, the nut lock preventing the vibration of the train from loosening or unscrewing the nut. Or the stem A may form the bearing for a carriage wheel and the part K would then represent part of the axle body. The inner face of the washer B in Fig. 1 is flat but when the washer is used to hold a carriage wheel I prefer to form such washer with a shoulder or rim L (Fig. 4) which prevents the axle grease from dripping or oozing out.

When the spring F is moved to its releasing position and the nut E unscrewed, the washer B can be readily slipped off or removed. The teeth D are inclined or undercut so as to allow the spring F to ride over the teeth when the nut is screwed home while preventing retrograde motion of the nut until the spring is in its releasing position.

To prevent the screw G in Fig. 1 from being entirely screwed out of the spring F whereby the screw might become lost I rivet or head the inner end of said screw so that said screw can be turned out sufficiently to allow the spring to move to its locking position while at the same time said screw cannot be entirely screwed out or lost.

The nut may have the hole for the stem or shank A tapped entirely through said nut as in Fig. 1 or the outer part of the nut may be closed as in Figs. 5 and 6.

What I claim as new, and desire to secure by Letters Patent, is—

1. The combination with a stem or shank having a screw-thread and an angular portion at the inner end of the screw-thread, a non-rotating washer having teeth and an angular opening engaging the angular portion of the shank, the screw nut having an orifice, a spring secured at one end to the outer face of the nut, and having the opposite end extending through the orifice thereof to engage the teeth of the washer, and means to operate the spring to release the nut, substantially as described.

2. The combination of a shank having a screw thread and an angular portion at the inner end of the screw thread, a washer having teeth and an angular opening engaging the angular portion of the shank, a screw nut having its outer face formed with a transverse groove, and a spring secured at one end to the outer face of the nut, extending across the groove and having its opposite end extending through an orifice in the nut to engage the teeth of the washer, substantially as described.

In testimony whereof I have hereunto set my hand in the presence of two subscribing witnesses.

JACOB THINNES.

Witnesses:
WM. C. HAUFF,
E. F. KASTENHUBER.